US006212708B1

(12) United States Patent
Mulaw

(10) Patent No.: US 6,212,708 B1
(45) Date of Patent: Apr. 10, 2001

(54) FAUCET SPLASH GUARD AND STORAGE UNIT

(76) Inventor: Azanaw Mulaw, 1901 Thistlewood Dr., Ft. Washington, MD (US) 20744

( * ) Notice: Subject to any disclaimer, the term of this patent is extended or adjusted under 35 U.S.C. 154(b) by 0 days.

(21) Appl. No.: 09/466,122

(22) Filed: Dec. 21, 1999

(51) Int. Cl.$^7$ .................................................... A47K 3/12
(52) U.S. Cl. ........................................ 4/657; 4/656; 4/658
(58) Field of Search .............................. 4/656, 657, 658, 4/609, 654; 211/119.009, 119.011, 41.3; 108/42, 90, 180, 165; 331/229

(56) References Cited

U.S. PATENT DOCUMENTS

| 544,105 | 8/1895 | Madsen . | |
|---|---|---|---|
| 1,302,658 | 5/1919 | Henning . | |
| 2,135,093 | * 11/1938 | Abrams . | |
| 2,508,808 | 5/1950 | Warman . | |
| 2,692,991 | 11/1954 | Church . | |
| 2,762,062 | 9/1956 | Barton . | |
| 2,970,321 | 2/1961 | Rovell et al. . | |
| 4,321,857 | * 3/1982 | Best | 99/340 |
| 4,713,949 | * 12/1987 | Wilcox | 211/134 |
| 5,012,934 | * 5/1991 | Newball | 211/41 |
| 5,392,902 | * 2/1995 | Vlastakis | 108/165 |
| 5,996,141 | * 12/1999 | Ibrahim | 4/609 |

OTHER PUBLICATIONS http://www.yourhomestore.com/cgi–bin.
http://www.craftassoc.com/tswood.html.
http://www.wdrake.com/shop/product.cfm.

* cited by examiner

Primary Examiner—Gregory L. Huson
Assistant Examiner—Khoa D. Huynh
(74) Attorney, Agent, or Firm—Siemens Patent Services LC

(57) ABSTRACT

A faucet splash guard and storage unit comprising a rear wall. A right side wall is affixed to and extends at a right angle outwardly from a first side edge of the rear wall. A left side wall is affixed to and extends at a right angle outwardly from a second side edge of the rear wall. A top wall is affixed to and extends between top edges of the rear wall, the right side wall, and the left side wall. A fastener disposed to encircle the faucet is mounted to the rear wall. The faucet splash guard and storage unit will stand and extend over a faucet and bowl of a kitchen sink, to protect surrounding areas about the faucet and the bowl from splash water and keep the areas clean and dry. The top wall provides extra shelf room for other articles needed.

6 Claims, 3 Drawing Sheets

FAUCET SPLASH GUARD AND STORAGE UNIT

BACKGROUND OF THE INVENTION

1. Field of the Invention

The present invention relates generally to protective sink shields. More particularly, the invention comprises a faucet splash guard and storage unit.

In general, a first field of use of the disclosed invention is by any household desiring the unique advantages of the instant invention. However, many other fields, such as in hotels, restaurants and other similar places, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Attempts have been made in the prior art to devise protective sink shields to prevent the splashing and splattering of water. Protective sink shields are shown in U.S. Pat. No. 544,105, issued to Madsen on Aug. 6, 1895, U.S. Pat. No. 1,302,658, issued to Henning on May 6, 1919, U.S. Pat. No. 2,508,808, issued to Warman on May 23, 1950, U.S. Pat. No. 2,692,991, issued to Church on Nov. 2, 1954, U.S. Pat. No. 2,762,062, issued to Barton on Sep. 11, 1956 and U.S. Pat. No. 2,970,321, issued to Rovell et al. On Feb. 7, 1961.

U.S. Pat. No. 544,105 to Madsen discloses a sink and washtub. Splash-boards are provided at the rear part, especially when arranged in a corner. The splash-boards impart a clean and neat appearance and protect the wall against the splashing of water.

U.S. Pat. No. 1,302,658 to Henning discloses a splash guard for kitchen sinks and the like. The splash guard will prevent the splashing and splattering of water when drawn from the water faucets, or when washing dishes, preparing foods and the like.

U.S. Pat. No. 2,508,808 to Warman discloses an antisplash shield. The antisplash shield can be guickly and easily applied to a liquid receptacle such as a sink, wash-bowl, washing machine, bathtub, wash-tray or the like.

U.S. Pat. No. 2,692,991 to Church discloses a splash guard for sink tops. The splash guard is adapted as a shield for a conventional sink top cover which may have been deteriorated by the dripping of water from the sink faucet. This will eliminate the necessity of completely replacing the sink top.

U.S. Pat. No. 2,762,062 to Barton discloses a protective cover for surfaces at sinks. The protective cover is constructed and arranged for draining water splashed thereon into the sink to prevent damage to the sink top and cabinet.

U.S. Pat. No. 2,970,321 to Rovell et al. Discloses a protective spray shield apparatus. The protective spray shield apparatus is for use in a pre-rinsing operation for articles such as dishes, trays, tableware, etc., to protect the operator from the spray created while pre-rinsing such articles.

The present invention is completely different than these patents in that it consists of a free standing shelved compartmented kitchen sink splash guard. It protects the surrounding areas about the faucet and the bowl from splashed water to keep the areas clean and dry, while providing extra shelf room for other articles needed.

The following three web sites that relate generally to this invention are as follows:

http://www.yourhomestore.com/cgi-bin, http://www.craftassoc.com/tswood.html and http://www.wdrake.com/shop/product.cfm The first web site is for Your Home Store. It discloses an over the sink shelf. The shelf measures 30 inches wide, 6½ inches deep and 9 inches high.

The second web site is for T's Wood Creations. It discloses a kitchen sink shelf. The description is as follows: Adorable shelves that create space and organization. The shelf measures 37 inches long, 5½ inches wide and 14 inches high.

The third web site is for Walter Drake. It discloses a 2-tier oversink shelf. The description is as follows: Instantly add extra counter space to your kitchen! Attractively display plants, herbs, knickknacks! Wooden rack has hanging hooks for 6 mugs, slide-out cutting board, cork board for recipes and storage hook for rings or sponges. 36×10¾×6 inches. Ends clutter forever!

The present invention is completely different than these those show in web sites in that it consists of a free standing shelved compartmented kitchen sink splash guard. None of the above shelves are equipped with a back wall splash guard made of waterproof material.

None of the above inventions, patents, and web sites, taken either singly or in combination, is seen to describe the instant invention as claimed.

SUMMARY OF THE INVENTION

The present invention is a faucet splash guard and storage unit that consists of a free standing shelved compartmented kitchen sink splash guard. It protects the surrounding areas about the faucet and bowl from splash water to keep the areas clean and dry, while providing extra shelf room for other articles needed.

Accordingly, it is a principal object of the invention to provide a faucet splash guard and storage unit that will overcome the shortcomings of the prior art devices.

Another object of the invention is to provide a faucet splash guard and storage unit that will eliminate faucet water splashing during washing, which will keep the surrounding areas dry and clean, while giving extra protection to wall paint and any other materials nearby.

An additional object of the invention is to provide a faucet splash guard and storage unit that will organize and save space by giving extra room for other article needs, while adding a very attractive decorative look to the kitchen sink.

A further object of the invention is to provide a faucet splash guard and storage unit that is simple and easy to use.

A still further object of the invention is to provide a faucet splash guard and storage unit that is economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
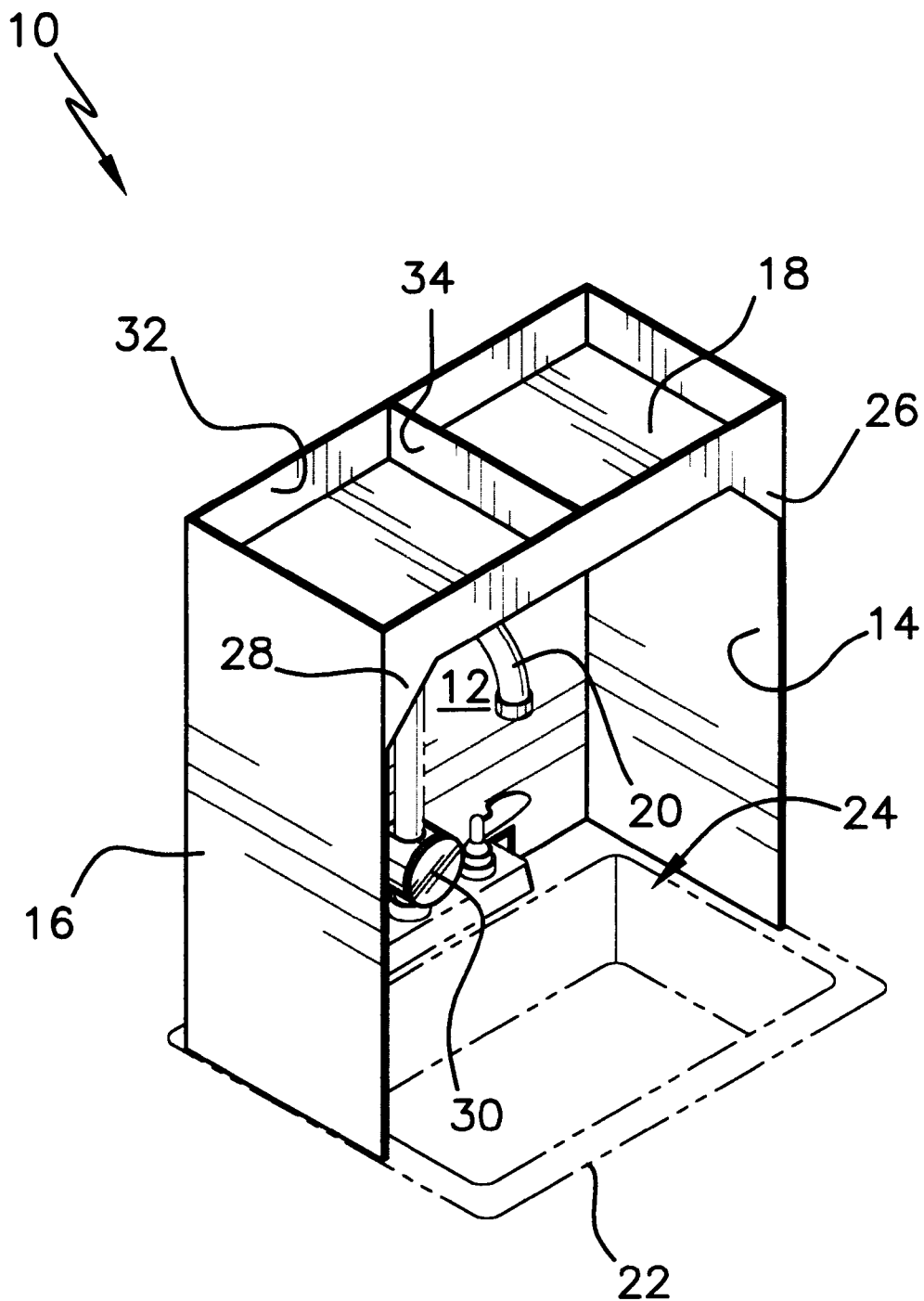
FIG. 1 is a diagrammatic perspective view of a first embodiment of the present invention placed over a kitchen sink with single bowl shown in phantom.

Turning now descriptively to the drawings, in which similar reference characters denote similar elements throughout the several views, FIG. 1 illustrates a first embodiment of the present invention being a faucet splash guard and storage unit 10 comprising a rear wall 12. A right side wall 14 is affixed to and extends at a right angle outwardly from a first side edge of rear wall 12. A left side wall 16 is affixed to and extends at a right angle outwardly from a second side edge of rear wall 12. A top wall 18 is affixed to and extends between top edges of rear wall 12, right side wall 14 and left side wall 16. Faucet splash guard and storage unit 10 will stand and extend over a faucet 20 and bowl 22 of a kitchen sink 24, shown in phantom,to protect surrounding areas about faucet 20 and bowl 22 from splash water and keep the areas clean and dry. Top wall 18 provides extra shelf room for other articles needed.

Rear wall 12, right side wall 14, left side wall 16 and top wall 18 are each formed of a sheet of waterproof material. Faucet splash guard and storage unit 10 further includes a pair of triangular braces 26, 28. First triangular brace 26 is affixed to and extends between an upper front edge of right side wall 14 and a right front edge of top wall 18. Second triangular brace 28 is affixed to and extends between an upper front edge of left side wall 16 and a left front edge of top wall 18. The triangular braces 26, 28 will help stabilize faucet splash guard storage unit 10.

An adjustable fastener 30 can be mounted centrally near a lower edge in rear wall 12, so that adjustable fastener 30 when connected to faucet 20 by directly encircling faucet 20 will hold rear wall 12 stationary in place. Back edge, side edges and front edge of top wall 18 include an upstanding flange 32, to help retain articles placed on top wall 18. Top wall 18 also includes an upstanding partition 34, so as to divide top wall 18 into two compartments for storage of different articles.

Figure 2:
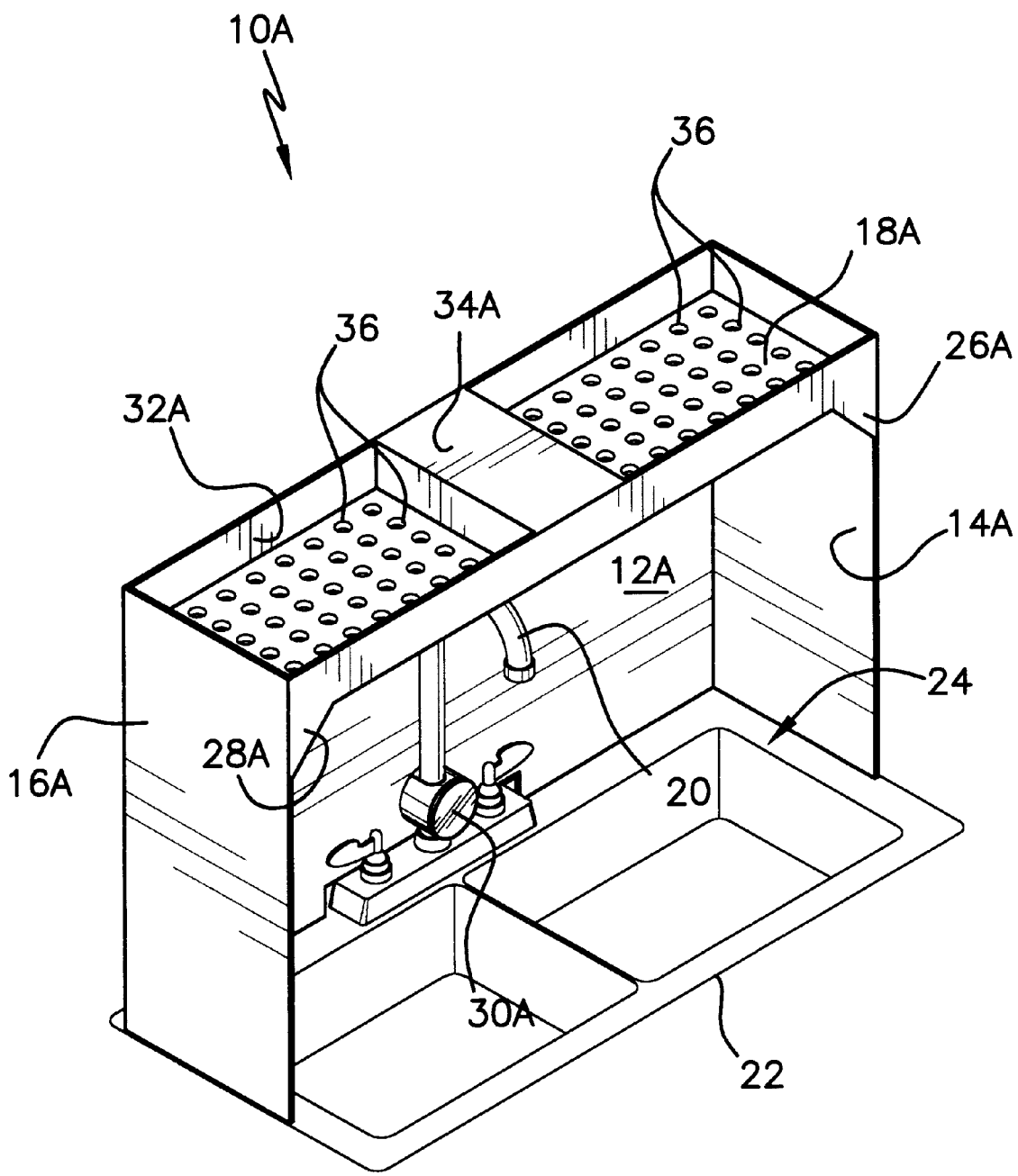
FIG. 2 is a diagrammatic perspective view of a second embodiment of the present invention used for a kitchen sink with double bowl.

FIG. 2 illustrates a second embodiment of the present invention being a faucet splash guard and storage unit 10a comprising a rear wall 12a. A right side wall 14a is affixed to and extends at a right angle outwardly from a first side edge of rear wall 12a. A left side wall 16a is affixed to and extends at a right angle outwardly from a second side edge of rear wall 12a. A top wall 18a is affixed to and extends between top edges of rear wall 12a, right side wall 14a and left side wall 16a. Faucet splash guard and storage unit 10a will stand and extend over a faucet 20 and double bowl 22 of a kitchen sink to protect surrounding areas about the faucet and double bowl from splash water and keep the areas clean and dry. Top wall 18a provides extra shelf room for other articles needed.

Rear wall 12a, right side wall 14a, left side wall 16a and top wall 18a are each formed of a sheet of waterproof material. Faucet splash guard and storage unit 10a further includes a pair of triangular braces 26a, 28a. First triangular brace 26a is affixed to and extends between an upper front edge of right side wall 14a and a right front edge of top wall 18a. Second triangular brace 28a is affixed to and extends between an upper front edge of left side wall 16a and a left front edge of top wall 18a. The triangular braces 26a, 26a will help stabilize faucet splash guard storage unit 10a.

An adjustable fastener 30a can be mounted centrally near a lower edge in rear wall 12a, so that adjustable fastener 30a when connected to the faucet will hold rear wall 12a stationary, in place. Back edge, side edges and front edges of top wall 18a include an upstanding flange 32a, to help retain articles placed on top wall 18a.

Top wall 18a, as shown in FIG. 2, is perforated by having a plurality of small drainage holes 36, so that any wet articles placed thereon can drip dry. Top wall 18a also includes an upstanding partition 34a, so as to divide top wall 18a into two compartments for storage of different articles.

Figure 3:
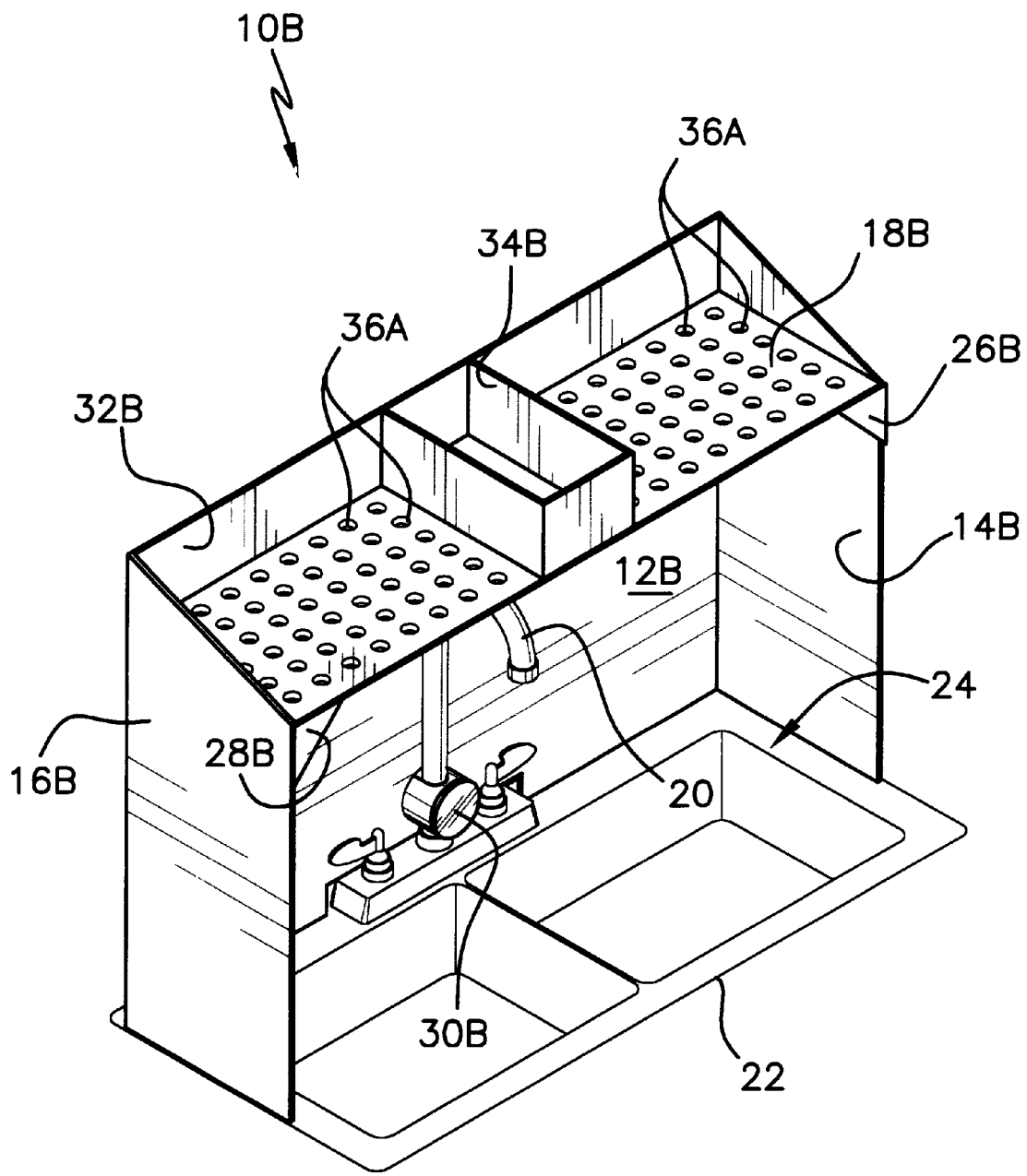
FIG. 3 is a diagrammatic perspective view of a third embodiment of the present invention similar to FIG. 2, also used for a kitchen sink with double bowl.

FIG. 3 illustrates a third embodiment of the present invention being a faucet splash guard and storage unit 10b comprising a rear wall 12b. A right side wall 14b is affixed to and extends at a right angle outwardly from a first side edge of rear wall 12b. A left side wall 16b is affixed to and extends at a right angle outwardly from a second side edge of rear wall 12b. A top wall 18b is affixed to and extends among top edges of rear wall 12b, right side wall 14b and left side wall 16b. Faucet splash guard and storage unit 10b will also stand and extend over a faucet and double bowl of a kitchen sink (not shown), to protect surrounding areas about the faucet and double bowl from splash water and keep the areas clean and dry. Top wall 18b provides extra shelf room for other articles needed.

Rear wall 12b, right side wall 14b, left side wall 16b and top wall 18b are each formed of a sheet of waterproof material. Faucet splash guard and storage unit 10b further includes a pair of triangular braces 26b, 28b. First triangular brace 26b is affixed to and extends between an upper front edge of right side wall 14b and a right front edge of top wall 18b. Second triangular brace 28b is affixed to and extends between an upper front edge of left side wall 16b and left front edge of top wall 18b. The triangular braces 26b, 28b will help stabilize faucet splash guard storage unit 10b.

An adjustable fastener 30b can be mounted centrally near a lower edge in rear wall 12b, so that adjustable fastener 30b connected to the faucet will hold rear wall 12b stationary in place. Back edge and side edges of top wall 18b includes an upstanding flange 32b, to help retain articles placed on top wall 18b.

Top wall 18b, as shown in FIG. 3, is perforated by having a plurality of small drainage holes 36a, so that any wet articles placed thereon can drip dry. Top wall 18b also includes an upstanding partition 34b, so as to divide top wall 18b into three compartments for storage of different articles.

It is to be understood that the present invention is not limited to the embodiments described above, but encompasses any and all embodiments within the scope of the following claims.

I claim:

1. A faucet splash guard and storage unit for standing over a faucet and bowl of a kitchen sink, to protect surrounding areas about the faucet and the bowl from splash water and keep the areas clean and dry, and for providing extra shelf room for other articles needed, comprising:

a rear wall having a first side edge, a second side edge, and a top edge;

a right side wall affixed to and extending at a right angle outwardly from said first side edge of said rear wall, and having a top edge;

a left side wall affixed to an extending at a right angle outwardly from said second side edge of said rear wall, and having a top edge;

a top wall affixed to and extending between said top edge of said rear wall, said too edge of said right side wall, and said top edge of said left side wall; and a fastener adapted to directly encircle the faucet, wherein said fastener is mounted to said rear wall and holds said rear wall in place when connected to the faucet.

2. The faucet splash guard and storage unit as recited in claim 1, wherein said rear wall, said right side wall, said left side wall and said top wall are each formed of of waterproof material.

3. The faucet splash guard and storage unit as recited in claim 1, further including a first triangular brace and a second triangular brace, in which said first triangular brace is affixed to and extends between said right side wall and said top wall, while said second triangular brace is affixed to and extends between said left side wall and said top wall.

4. The faucet splash guard and storage unit as recited in claim 1, wherein said top wall includes an upstanding flange to help retain articles placed on said top wall.

5. The faucet splash guard and storage unit as recited in claim 1, wherein said top wall is perforated by having a plurality of drainage holes, so that any wet articles placed thereon can drip dry.

6. The faucet splash guard and storage unit as recited in claim 1, wherein said top wall includes an upstanding partition, so as to divide said top wall into at least two compartments for storage of articles.

\* \* \* \* \*